J. L. Todd,
Governor.
No. 108,848.   Patented Nov. 1, 1870.
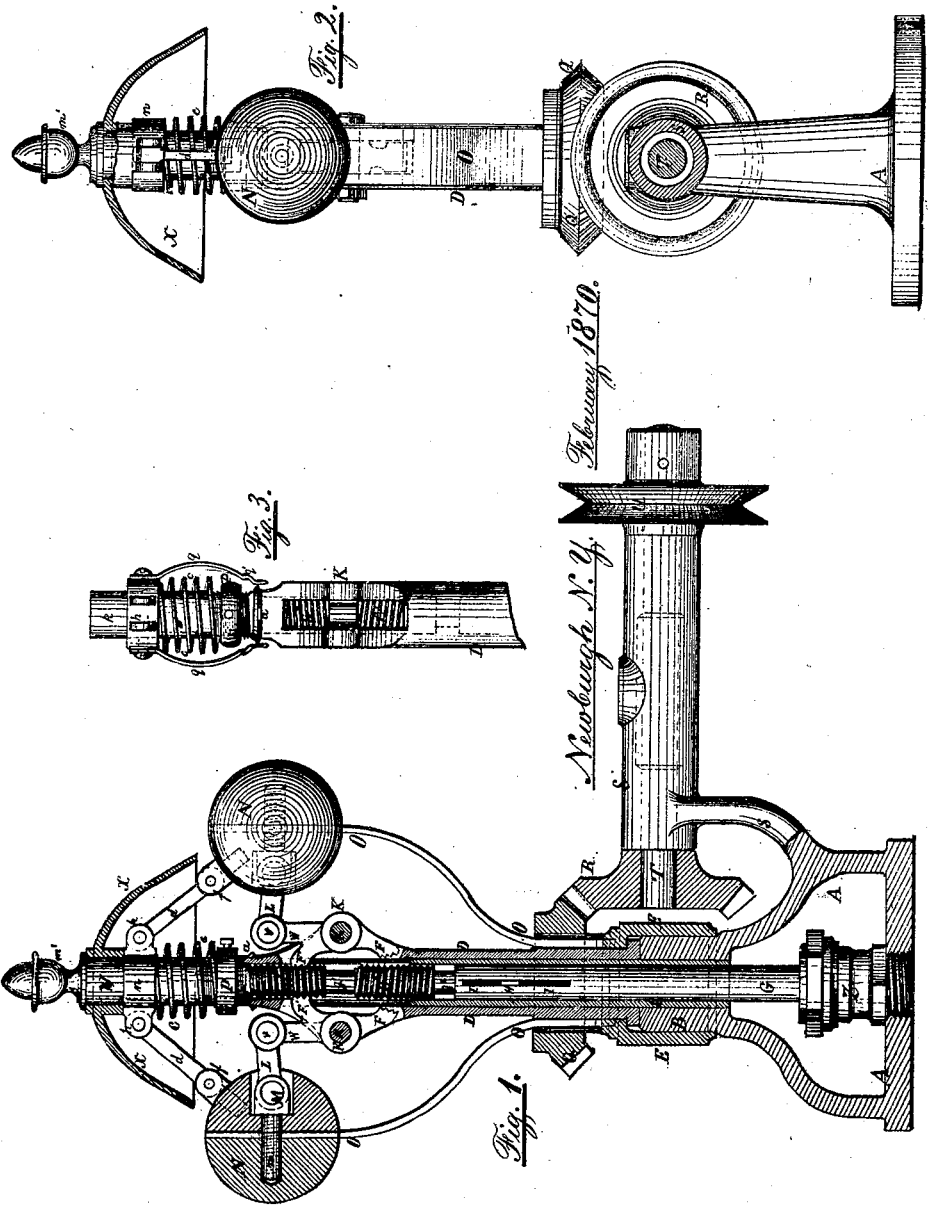

United States Patent Office.

JAMES L. TODD, OF NEWBURG, NEW YORK.

Letters Patent No. 108,848, dated November 1, 1870.

IMPROVEMENT IN GOVERNORS.

The Schedule referred to in these Letters Patent and making part of the same.

*To all whom it may concern:*

Be it known that I, JAMES L. TODD, of Newburg, in the county of Orange and State of New York, have invented a new Governor; and I do hereby declare that the following is a full, clear, and exact description of the same, reference being had to the accompanying drawing and to the letters of reference thereon.

The nature of my invention consists in combining the sensibility of a governor, especially of a high-speed governor, with the power of the screw to move a governor-valve, either one way or another, to open it more or to shut it, according to the quantity of steam required to do the work with a certain speed.

The high-speed governor shows any irregularity of the speed of the engine quicker than a slow-moving one; and this governor is so arranged that the governor-balls are connected directly to a pair of double-armed bell-cranks, the ends of which represent parts of nuts, with right and left-hand threads, to match into right-and-left screws cut upon the governor-spindle, which will be moved up or down by either one pair or the other pair of arms being thrown into the thread of the screw by the irregular motion or speed of the governor-balls.

The spindle, being moved up or down, operates the valve, which remains in position, as soon as the governor moves at its regular speed, when neither pair of arms are in contact with the screw.

This arrangement leaves the valve itself disconnected from the governor as often as the engine or the governor run at their regular speed.

The engine may run light or with a load, and as soon as the load of the engine is changed, and, with it, the speed, the least change in the speed makes the arms enter the thread on the governor-spindle and set the valve right to admit steam enough to do the new work with the same speed.

The movement of the valve is done quick and positive, every turn or revolution of the governor moving the spindle as much as the pitch of the screw from the time the arms enter the thread. The valve itself, which preferably is a balanced valve, requires little power to be moved; but should it even require more power than usual, this combination of power, the centrifugal motion of the governor-balls with the screw will certainly move the steam-valve, and can easily be so arranged as to regulate the cut-off valve on steam-engines, or to any other rigging or machinery, to regulate water-gates for water-wheels, &c., on account of the power which is gained in this combination of the high-speed governor and the screw.

The length of the screw determines the range of regulation by the governor, and the distance between the ends of the double arms again gives the length of the screw.

On a balanced steam-valve, only a short distance has to be traveled over by the valve-rod to open or to shut the valve complete.

The motion of the valve-rod, after the valve is fully open or shut, is stopped by the thread being turned away on the spindle, so that the arms run out the thread on the spindle as soon as the valve is full open or shut; the upper arms as well as the lower arms, run out at the same distance, and, therefore, the thread has to be turned away only where the right-hand and left-hand threads meet on the spindle.

A small attachment is made to the governor to regulate the springs to run the governor the right speed.

The governor-balls, which are preferably fastened to a pair of elliptical springs, are connected by a pair of small links to a common cross-head, which can slide up or down on the spindle above the balls, and which is kept up by a spiral spring below the cross-head.

This spiral spring can be strengthened or loosened by a movable collar below it on the same spindle being screwed up or down on threads cut on the spindle for that purpose.

Above the spindle is fastened an ornament to give the whole a good finish, and to cover some of the smaller parts of the governor.

For further explanation, I refer to the drawing, in which—

Figure 1 represents a longitudinal vertical section of the governor.

Figure 2 is a side view.

Figure 3, a front view of the upper part of the governor-spindle.

A represents the bonnet of the steam-valve chamber, and through it passes the rod G, which connects with the stem of the steam-valve.

The friction of the rod G in the stuffing-box Z holds the valve and stem from dropping down, and keeps it where the governor places it.

Into the top part B of the bonnet is screwed in or securely fastened a hollow tube, C C, which is stationary with the bonnet, but around which moves another tube D D, by means of a bevel-wheel, Q, fastened to the lower end of tube D, and driven by another bevel-gear, R, attached to a shaft, T, which is running through sleeve S, and is driven by pulley U.

The sleeve E E, which is fastened to the top part of B, in halves, holds the tube D D in position.

The two elliptical springs, O O, carry at their upper ends the two balls N N, which are made in halves and held together and to the springs by means of bolts $m$ $m$ with heads M M.

These balls N N are connected by two links, L L, to the arms W W of two fork-shaped toes, F F′ F′, which turn on the pins $k\ k$ between the lugs K, cast on the tube D D, and turn with the sleeve D D.

The center rod G is movable only up or down, and is prevented from turning by a key, H, through the stationary tube C C, but the slot I allows the rod G to move up and down as much as is required to open the steam-valve or to shut it.

At the upper end of the rod G is cut right-hand thread $G^2$ and left-hand thread $G^1$, which are so placed that the upper arms F' F', the faces of which contain corresponding threads, will lie in the thread $G^2$ when the governor is running below its regular speed, or in the space $g'$, between $G^2$ and $G^1$, when the governor is running slow or is stopping altogether—the valve is open in that instance; or the lower arms F F lie with their faces in the thread $G^1$ when the governor runs too quick; and, in this case, the valve is being closed more and more until the arms F F come in the same space $g'$, when the valve is closed, and the governor will regain its regular speed or run below it, when again the upper arms F' F' will fall in the thread $G^2$, and screw open the valve again; only, as soon as the governor runs at its regular speed, both pair of toes, F F and F' F', are out of the thread, and the spindle G is free or disconnected from the influence of the balls.

The balls N N are only allowed to travel a short distance toward the spindle or from it, and the springs O O, which carry the balls, are so sensitive that only a very small difference in motion is required to throw the balls out or draw them in, which motion sets to work the lower or upper toes and regulates the position of the valve to give just sufficient steam to do the work with the normal speed.

To regulate the elliptic springs O O and the speed at which the governor shall usually run, the balls N N are hung up by small links, $d\ d$, to a cross-head, $n$, which is pushed or pressed upward against a shoulder, V, by an adjustable spiral spring, $c\ c$.

By screwing up or down the ring or nut P on the thread that is cut on the spindle D D the spring $c\ c$ can be loosened or tightened, so that the balls N N have to pull more or less by diverging to get the toes F F' out the thread on spindle G.

Right below the ring or nut P is, on the sleeve D, a ring, $a\ a$, cast on for the purpose of letting a pair of small springs, $q\ q$, which are fastened to cross-head $n\ n$, mark a light stopping place, when the recess $q'$ in the spring rests on the edge of $a\ a$, which is the case when the governor runs at the regular speed, and both toes F and F' are out of the thread on the spindle G.

It will require a little power to make the springs $q\ q$ slip over the edge $a$, and that is sufficient to push the toes F F or F' F' deep into the thread $G^1$ or $G^2$ to work well in the thread.

A bell-shaped ornament, $x$, fastened on top of stem V, serves to cover the smaller parts of the governor and to give a pleasant finish to the whole governor.

What I claim, and desire to secure by Letters Patent, is—

1. The double-armed bell-cranks F and F', with right-hand and left-hand thread on their faces to act as nuts alternately on a right-hand and left-hand screw, for the purpose as specified.

2. The spindle G, with right and left-hand thread cut on it, so that the nuts F and F', acting on it and turning in the same direction, will raise or lower it.

3. The direct connection of the governor-balls N N with the arms F F' by means of the links L L, for the purpose of throwing either arms F F or F' F' into the right-hand or the left-hand screw $G^2$ or $G^1$ on the spindle G, to move up or down the spindle G, which may be connected to a steam-valve, variable cut-off rigging, water-gate, &c., as specified.

4. The spindle G, provided with recessed spaces $g^1$ and $g^2$ at the end of the thread for the purpose of preventing excessive play or movement of the valve-stem.

5. The combination of the elliptical springs $q\ q$, connected to cross-head $n$, with the sharp-edged collar $a$, for the purpose of preventing the flutter of the balls, incidental to the irregular motion of each single stroke of the steam-engine, from throwing either arms F or F' in the thread on spindle G.

JAMES L. TODD.

Witnesses:
ARTHUR V. WILTSIE,
J. O. LEE.